US012451307B1

(12) United States Patent
Chen et al.

(10) Patent No.: US 12,451,307 B1
(45) Date of Patent: Oct. 21, 2025

(54) BUTTON-SWITCH ASSEMBLY FOR AR-VR DEVICE

(71) Applicants: Chao Chen, Marina Del Rey, CA (US); Mark Kraz, Los Gatos, CA (US); Nicholas Streets, View Park, CA (US)

(72) Inventors: Chao Chen, Marina Del Rey, CA (US); Mark Kraz, Los Gatos, CA (US); Nicholas Streets, View Park, CA (US)

(73) Assignee: Snap Inc., Santa Monica, CA (US)

( * ) Notice: Subject to any disclaimer, the term of this patent is extended or adjusted under 35 U.S.C. 154(b) by 177 days.

(21) Appl. No.: 18/139,048

(22) Filed: Apr. 25, 2023

(51) Int. Cl.
*H01H 13/14* (2006.01)
*H01H 13/06* (2006.01)
*H01H 13/705* (2006.01)

(52) U.S. Cl.
CPC ............ *H01H 13/14* (2013.01); *H01H 13/06* (2013.01); *H01H 13/705* (2013.01)

(58) Field of Classification Search
CPC ...... H01H 13/14; H01H 13/06; H01H 13/705; H01H 3/12
See application file for complete search history.

(56) References Cited

U.S. PATENT DOCUMENTS 8,008,590 B2 * 8/2011 Chen ...................... H01H 13/83 200/314
11,694,861 B2 * 7/2023 Chen ...................... H01H 9/047 200/302.2
11,921,542 B2 * 3/2024 Tamura ................ G06F 3/0202

* cited by examiner

*Primary Examiner* — Lheiren Mae A Caroc
(74) *Attorney, Agent, or Firm* — CM Law; Stephen J. Weed

(57) ABSTRACT

A button-switch assembly provides a preloaded force design with an enhanced tactile feel while also providing a non-wobbly (stabilized) configuration and water/dust protection functions. Features of the button-switch assembly include excellent tactile feel through a stack up of a soft rubber layer of a deflection web and a hard PET film shim layer, a consistent pre-loaded push force through use of an angled deflection web, a button flange that minimizes rotation of the button while providing a consistent tactile feel even when the edge of the button is depressed, double sided sealing adhesive layers that seal off the opening in the housing for accepting the button to prevent water/dust from entering the opening, and gluing the button to the rubber deflection web in variable thicknesses to provide a stable tension force to minimize wobble of the button when depressed.

18 Claims, 12 Drawing Sheets

BUTTON-SWITCH ASSEMBLY FOR AR-VR DEVICE

TECHNICAL FIELD

Examples set forth herein generally relate to a button-switch assembly for augmented reality (AR) and virtual reality (VR) devices such as AR-enabled wearable mobile electronic devices. In particular, the examples set forth herein relate to water and dust protected button-switch assemblies for AR-VR devices such as smart glasses.

BACKGROUND

Mobile electronic devices such as electronic eyewear devices may have electronics disposed therein that are activated by a switch. For example, electronic eyewear devices may have electronics, such as circuit boards and batteries, disposed in the temples or arms of the electronic eyewear devices that are controlled by users by depressing one or more buttons on the temples or arms of the electronic eyewear devices to activate a switch within the electronic circuitry.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Figure 1A:
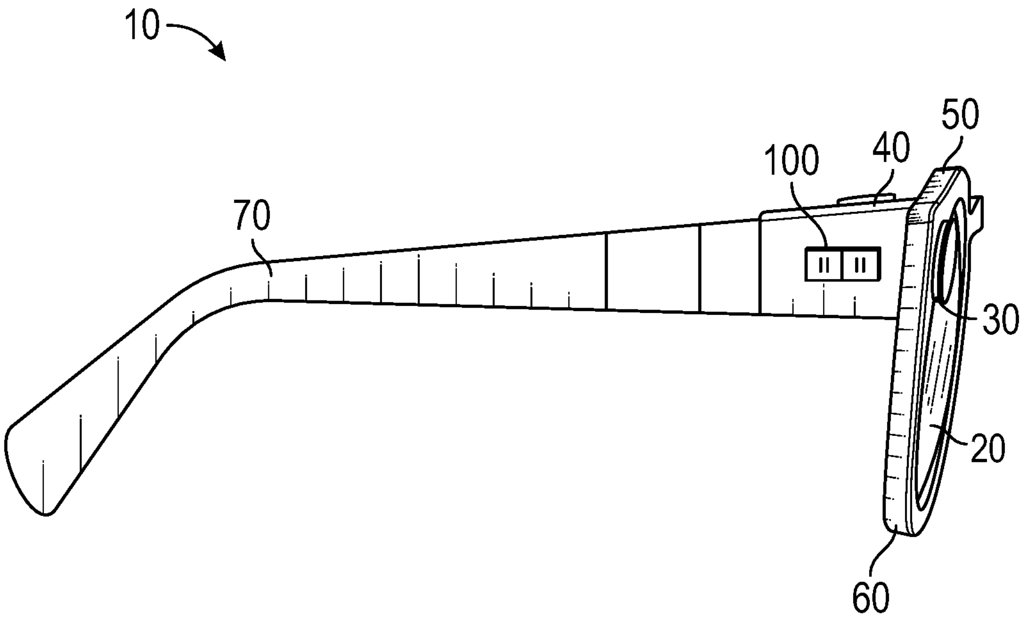
FIG. 1A is a side view of an example hardware configuration of an augmented reality (AR) enabled eyewear device having a push button input in a temple in a sample configuration.

To ensure reliability and longevity of the electronic eyewear devices, the buttons should not provide an opening through which water or dust may enter the frame of the electronic eyewear device so as to potentially harm the electronics of the electronic eyewear devices. The button-switch assembly described herein provides a preloaded force design with enhanced tactile feel while also providing a non-wobbly (stabilized) configuration and water/dust protection functions. Features of the button-switch assembly include excellent tactile feel through a stack up of a soft rubber layer of a deflection web and a hard polyethylene terephthalate (PET) plastic film shim layer, a consistent pre-loaded push force through use of an angled deflection web, a button flange that minimizes rotation of the button while providing a consistent tactile feel even when the edge of the button is depressed, double sided sealing adhesive layers that seal off the opening in the device housing for accepting the button to prevent water/dust from entering the opening, and gluing the button to the rubber deflection web in variable thicknesses to provide a stable tension force to minimize wobble of the button when depressed.

In sample configurations, the button-switch assembly includes a button, a housing with a hole adapted to accept the button, a key mat frame disposed beneath the button that includes an injection (e.g., plastic) part co-molded with a rubber layer and that has a pocket centered beneath the button, a shim actuator (e.g. plastic) placed in the pocket, a switch beneath the shim actuator, and a printed circuit board beneath the switch. In this configuration, depressing the button deflects the key mat frame and the shim actuator to depress the switch. The button and the housing may have a stair-stepped overlapping design whereby the button and the housing have variable thicknesses around a periphery of the button to stabilize the button-switch assembly during use. A double sided adhesive may be disposed between the housing and the key mat frame and between the key mat frame and the printed circuit board to provide a seal that prevents water or dust from accessing the printed circuit board around an outer surface of the key mat frame. In the sample configurations, the button includes side flanges around the periphery of the button that are adapted to engage the housing when the button is depressed off-center and rotates in a direction toward the housing.

A detailed description will now be provided with reference to FIGS. 1-12. Although this description provides a detailed description of possible implementations, it should be noted that these details are intended to be exemplary and in no way delimit the scope of the inventive subject matter. For example, though shown in sample configurations as a side button-switch assembly for an augmented reality (AR) and/or virtual reality (VR) enabled electronic eyewear device, it will be appreciated that the button-switch assembly described herein may be used in a variety of other configurations where features such as stability and water/dust protection is desired, such as in keyboard designs.

FIG. 1A is a side view of an example hardware configuration of an augmented reality (AR) enabled eyewear device 10 having a dust-protected button-switch assembly 100 in a temple 40 in a sample configuration. The eyewear device 10 includes an optical assembly 20 with an image display (not shown) for presenting a graphical user interface (GUI) or other image to a viewer. Eyewear device 10 may include multiple visible light cameras 30 that form a stereo camera, of which the first visible light camera 30 is located on a right temple 40 and a second visible light camera (not shown) is located on a left temple (not shown). In the illustrated example, the optical assembly 20 is located on the right side of the eyewear device 10. The optical assembly 20 can be located on the left side or other locations of the eyewear device 10.

The eyewear device 10 further includes a frame 50, a right rim 60, and a right arm 70. The eyewear device 10 includes the first visible light camera 30 connected to the frame 50 or the right temple 40 to capture a first image of the scene. Eyewear device 10 further includes a second visible light camera 30 connected to the frame 50 or a left temple (not shown) to capture (e.g., simultaneously with the first visible light camera 30) a second image of the scene which at least partially overlaps the first image. Although not shown in FIG. 1A, a processor and other electronics are coupled to the eyewear device 10 and are connected to the visible light camera 30, a memory accessible to the processor, and programming in the memory that may be provided in the eyewear device 10 itself. The electronics may be controlled in response to actuation of the button-switch assembly 100 in sample configurations.

Figure 1B:
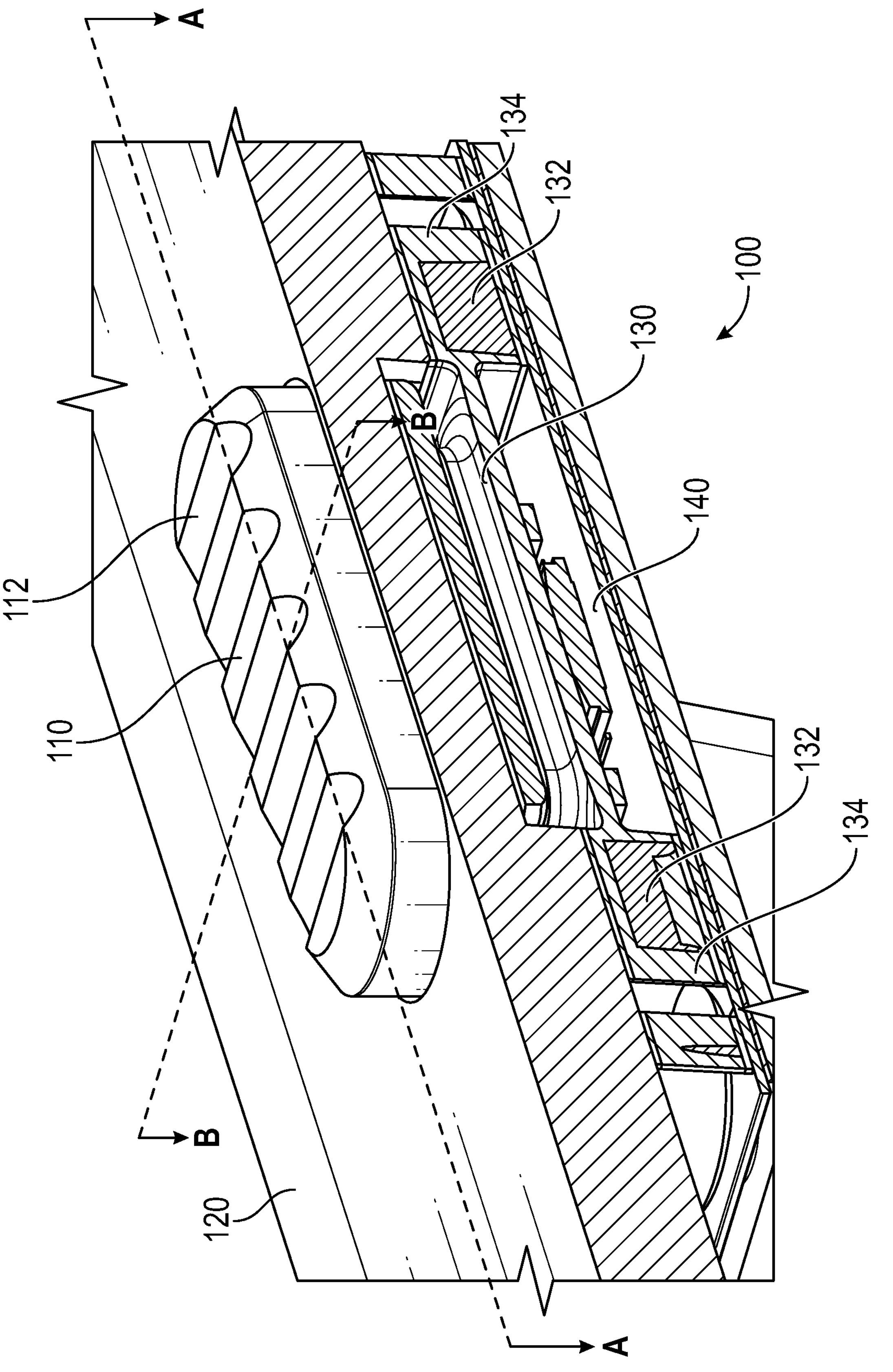
FIG. 1B is a cut-away perspective view of a water and dust protected button-switch assembly in a sample configuration within a temple of the eyewear of FIG. 1A.

FIG. 1B is a perspective view of the water and dust protected button-switch assembly 100 of the eyewear device 10 of FIG. 1A in a sample configuration. As illustrated, the button-switch assembly 100 includes a button 110 made of a durable material such as plastic or aluminum. The button 110 may include indentations 112 to improve the tactile feel. The button 110 is inserted through a button hole (not shown) in a device housing 120 that may be, for example, located in the temple of an electronic eyewear device. Located beneath the button 110 is a flexible key mat frame 130 that is, for example, formed by injection (e.g., plastic) plus a co-molded silicone rubber. For example, as shown by the cutaway view of the key mat frame 130, the key mat frame 130 may include a frame 132 (e.g., plastic) that is overmolded by rubber 134. The key mat frame 130 is mounted on a flexible PCB 140 that may, for example, contain electronic elements of the device.

Figure 2:
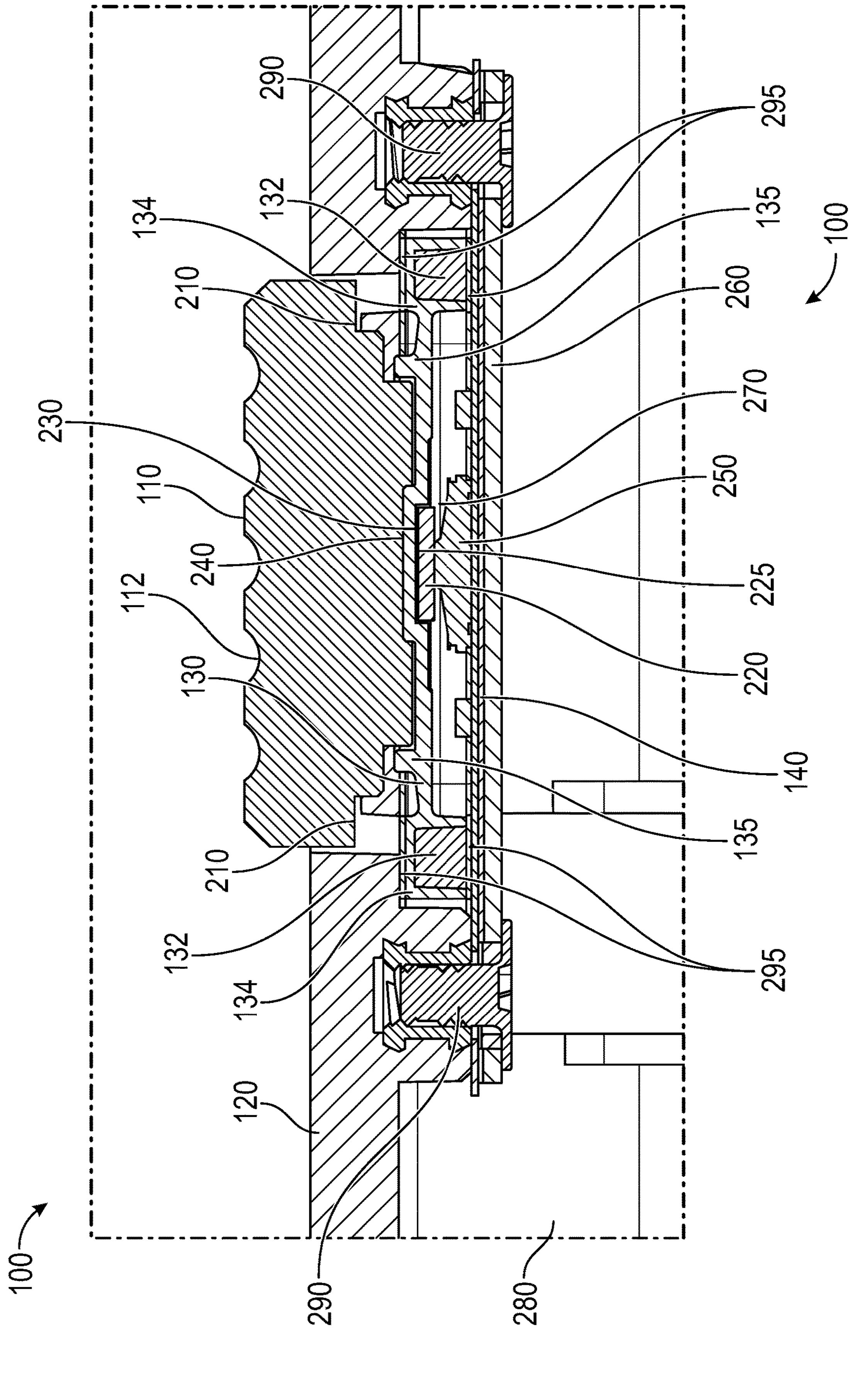
FIG. 2 is a cut-away view parallel to line A-A of the button-switch assembly of FIG. 1B.

FIG. 2 illustrates a cut-away view parallel to line A-A of the button-switch assembly 100 of FIG. 1B. As better seen in FIG. 2, the button 110 and the housing 120 may have a stair-stepped overlapping design at 210 whereby the button 110 and the housing 120 have variable thicknesses around the periphery of the button 110 to stabilize the button-switch assembly 100 during use. As also shown, centered under the button 110 is a PET shim actuator 220 that is glued (e.g., using ultra-violet or instant glue) into a tooled pocket 225 of the key mat frame 130 at 230. In turn, the key mat frame 130 may be glued (e.g., using ultra-violet or instant glue) to the button 110 at 240. When the button 110 is depressed, the key mat frame deflects the PET shim actuator 220 which, in turn, changes the state of a domed switch 250 that is mounted on the flexible PCB 140. In sample configurations, the flexible PCB 140 is backed by a metal stiffener 260 that stiffens the flexible PCB 140 sufficiently to assure that a force applied to the button 110 will activate the switch 250 via the PET shim actuator 220 with a better tolerance instead of simply flexing the flexible PCB 140. The PET shim actuator 220 also may be separated from the switch 250 by a film 270 (e.g., plastic) that provides a protective layer separating the button 110 from any electronics on the flexible PCB 140, and thus preventing water and/or dust from reaching the electronics on flexible PCB 140 via a gap between the button 110 and the housing 120. The housing 120 is further screwed down to a second housing portion 280 via screws inserted into respective screw holes 290. In sample configurations, double sided adhesive (e.g., tape) 295 also may be applied between the housing 120 and the key mat frame 130 and between the key mat frame 130 and the flexible PCB 140 to provide a seal that prevents water or dust access to the flexible PCB 140 around the outer surface of the key mat frame 130.

In a sample configuration adapted for use in a wearable eyewear device, the button-switch assembly 100 may have dimensions adapted to interaction with a user's finger. For example, the button 110 may have dimensions on the order of 13 mm by 2.6 mm; the rubber deflection web may have a thickness throughout of 0.2 mm that may be extended to 0.35 mm at points 135 adjacent the button 110. The housing 120 at the stair-stepped section 210 may have a thickness that varies from, for example, 0.5-1.0 mm. The PET shim actuator 220 may have a thickness of 0.2-0.35 mm. Of course, these dimension are given by way of example to provide an indication of relative thicknesses. The button-switch assembly 100 is not limited in size or shape.

The button-switch assembly 100 as configured provides an excellent tactile feel by stacking up the soft rubber layer 134 of the key mat assembly 130 and the hard PET film shim layer actuator 220, which together provide excellent tactile feel in extremely wide stack up thickness ranges. The thickness tolerances can be absorbed by the softer rubber layer 134 between the glued PET film shim actuator 220 and the glued button 110, while the hard PET film shim actuator 220 provides a firm and location accurate push to the domed switch 250 since the PET film shim actuator 220 is glued to a tooled pocket 225 within the key mat assembly 130.

Figure 3:
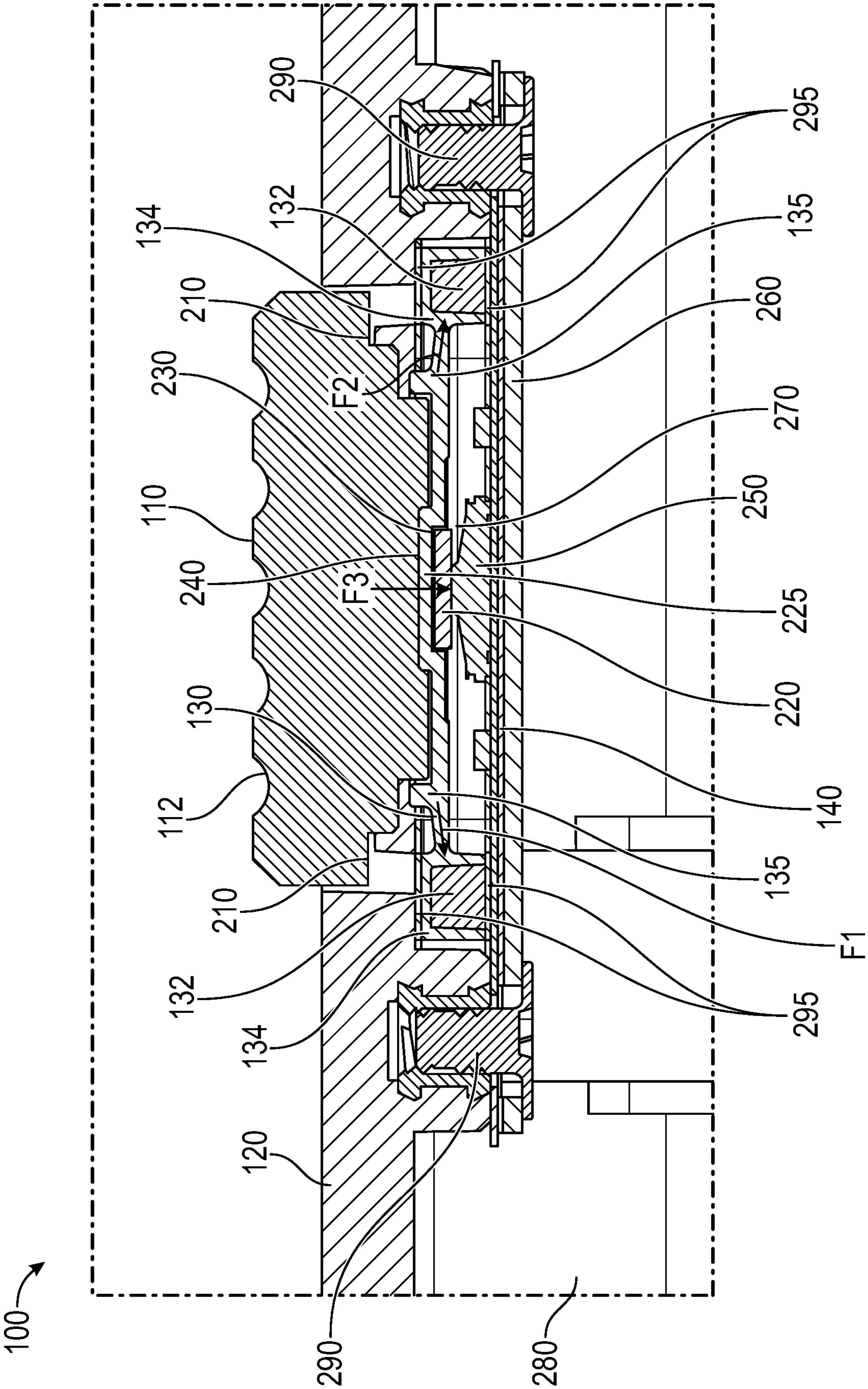
FIG. 3 is a cut-away view parallel to line A-A illustrating the angled deflection web tension forces adapted to generate a consistent push force to the button-switch assembly of FIG. 1B.

FIG. 3 illustrates the angled deflection web tension forces adapted to generate a consistent push force to the button-switch assembly 100 of FIG. 1B. As shown in FIG. 3, the angled deflection web tension forces F1 and F2 along the perimeter of the deflection web of the key mat assembly 130 generate a consistent push force F3 that is applied to the switch 250. Since the forces F1 and F2 are deflected at an angle, the peak force of the system is reduced. Also, as the tactile feel may be defined as a tactile ratio between (a) a difference between the peak force (force which makes the dome metal of switch 250 buckle) applied to the button 110 minus a volley force (minimum force to maintain the dome metal buckling stage of the switch 250) and (b) the peak force (i.e., (peak force-volley force)/peak force)), the tactile ratio can be significantly increased by the preloaded design that deflects the web tension forces. In sample configurations, a force of 40-45% above the volley force provides a desired high "click ratio" for the desired tactile feel; however, a force of only 20% above the volley force also may provide the desired tactile feel. It will be appreciated that as the actual peak force is reduced by introducing a preload force, additional tactile feel ratio ((peak force-volley force)/peak force) is gained.

Figure 4:
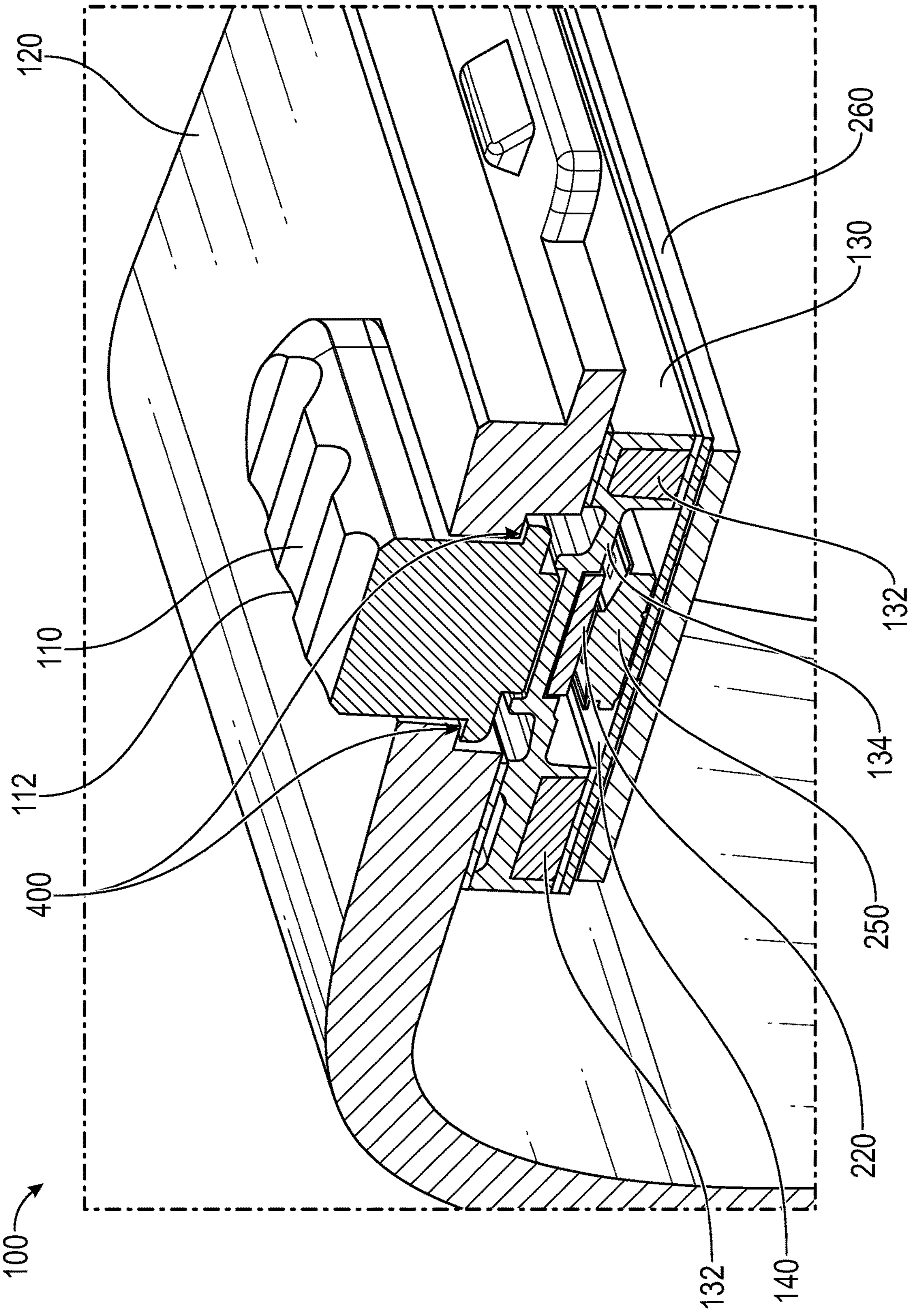
FIG. 4 is a cut-away view parallel to line B-B of the button-switch assembly of FIG. 1B.

FIG. 4 illustrates a cut-away view parallel to line B-B of the button-switch assembly 100 of FIG. 1B. FIG. 4 shows the side flanges 400 of the button 110 in the direction perpendicular to the side-view shown in FIG. 2. These side flanges 400 help to minimize "wobble" of the button 110 when depressed off-center.

Figure 5:
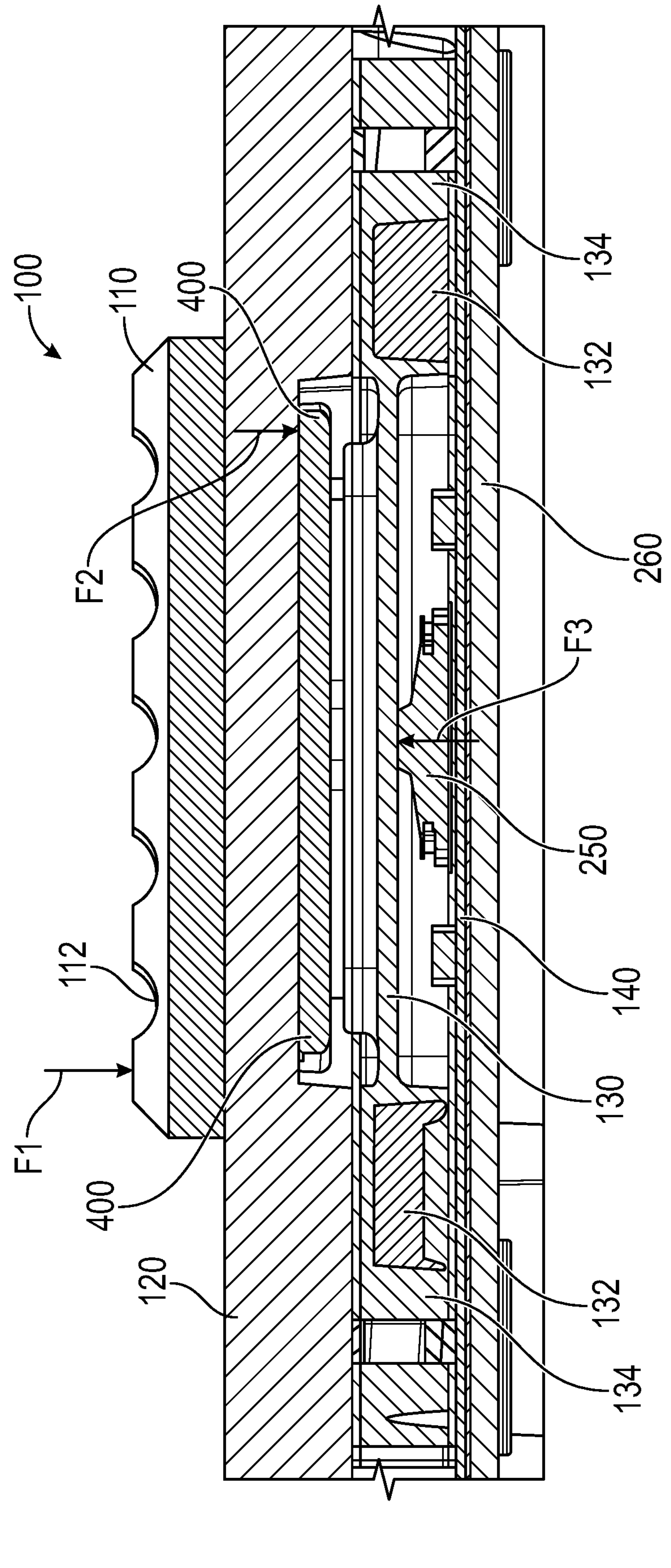
FIG. 5 is a cut-away view parallel to line A-A illustrating the touch forces for obtaining a tactile feel for the button-switch assembly of FIG. 1B.

For example, FIG. 5 illustrates the touch forces for obtaining a tactile feel for the button-switch assembly 100 of FIG. 1B. In this example, when the user's finger pushes the button 110 off-center, for example, the user applies a force F1 at one side of the button 110, the switch support force F3 will try to make the button 110 rotate. However, the other end of the button flange 400 will touch the housing 120 which, in turn, applies force F2 to the button flange 400 to prevent rotation. Thus, even though the touch force F1 is applied off-center, the touch force F1 will provide an appropriate tactile feel from the response force F3 from the domed switch 250. In addition, the rubber 134 of the key mat frame 130 further provides the "give" to minimize wobble of the button-switch assembly 100.

Figure 6:
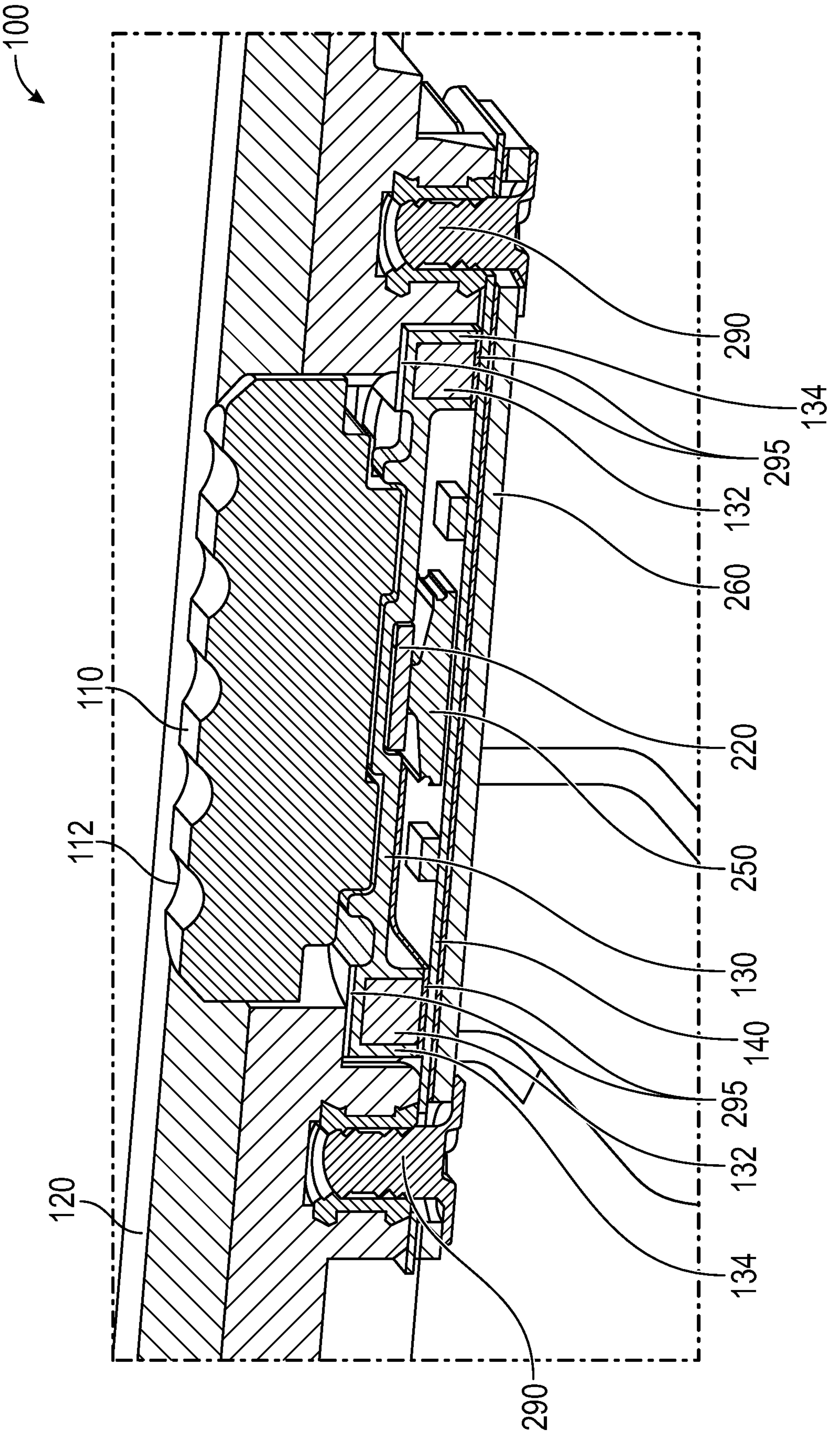
FIG. 6 is a cut-away view parallel to line A-A of the button-switch assembly of FIG. 1B showing the double sided adhesive between the button and the device housing to seal off the button opening in the device housing.

FIG. 6 illustrates a cut-away view parallel to line A-A of the button-switch assembly 100 of FIG. 1B showing the double sided adhesive 295 between the button 110 and the device housing 120 to seal off the button opening hole (not shown). The double sided adhesive 295 between the button 110 and device housing 120 seals off the button opening in the device housing 120 to prevent water or dust from entering the device housing 120 through the button opening. As illustrated in FIG. 6, the double sided adhesive 295 is also placed between the flexible PCB 140 and the key mat frame 130 of the button-switch assembly 100 to entirely seal off the electrical switch 250 and any electrical components on the flexible PCB 140.

Figure 7:
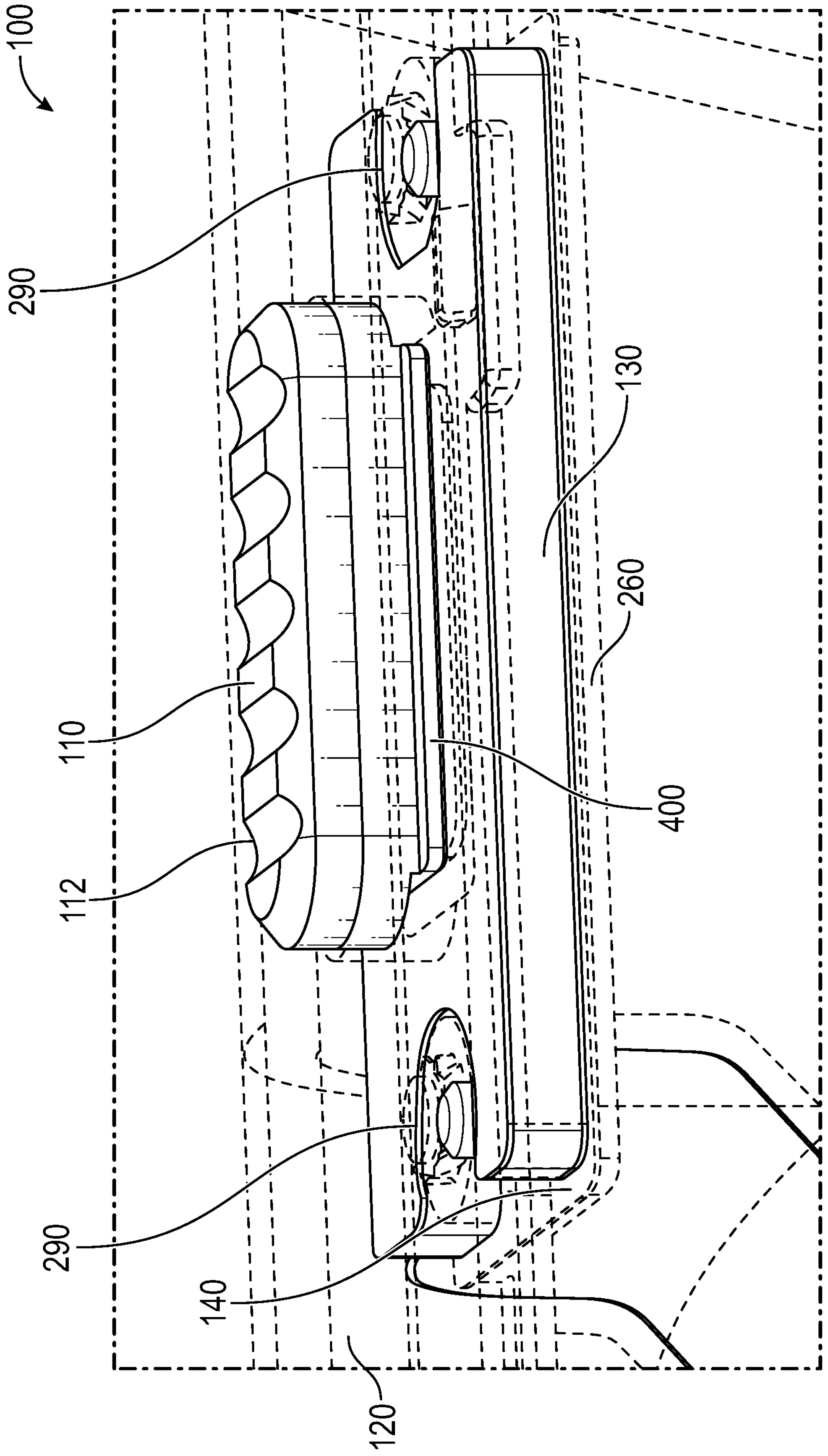
FIG. 7 is a side perspective view of the button-switch assembly of FIG. 1B with the device housing made transparent to expose the underlying key mat assembly.

FIG. 7 illustrates a side perspective view of the button-switch assembly 100 of FIG. 1B with the device housing 120 made transparent to expose the underlying key mat assembly 130 that encloses the electronics on the flexible PCB 140.

Figure 8:
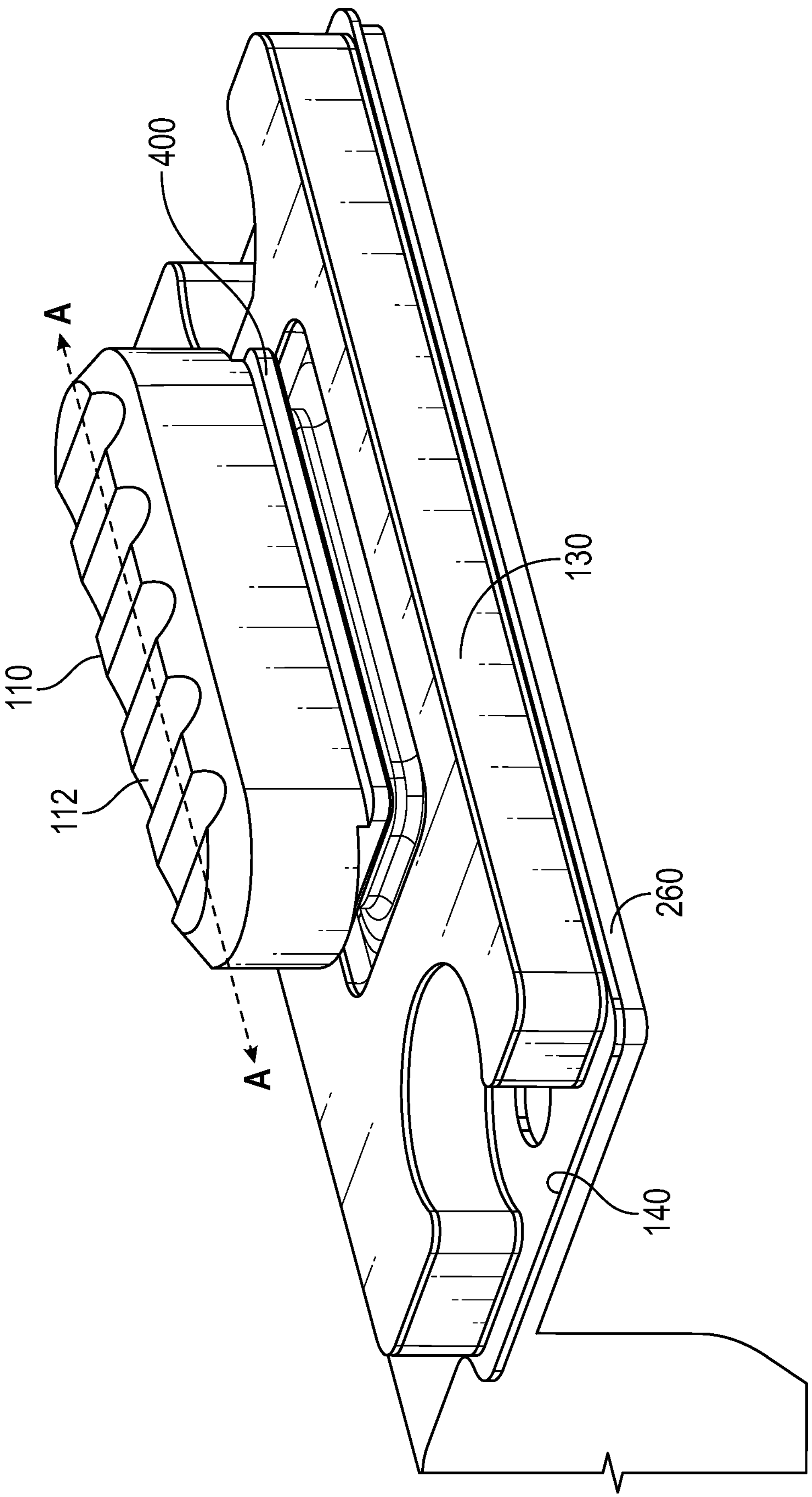
FIG. 8 is a perspective view of the button-switch assembly of FIG. 1B with the device housing removed to better illustrate the mounting of the key mat assembly on the underlying flexible printed circuit board.

FIG. 8 illustrates the button-switch assembly 100 of FIG. 1B with the device housing 120 removed to better illustrate the mounting of the key mat assembly 130 on the underlying flexible PCB 140.

Figure 9:
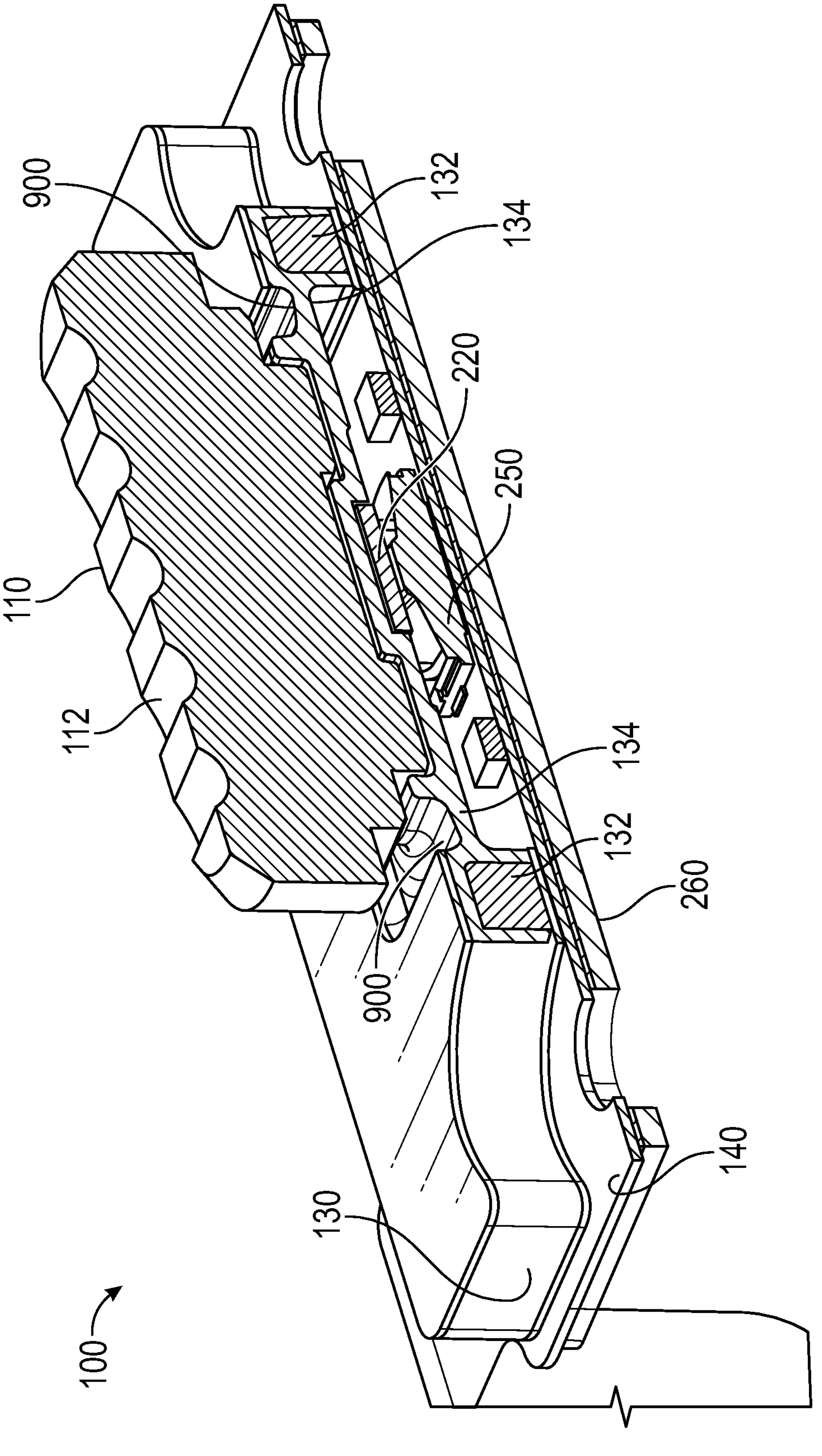
FIG. 9 is a cut-away view parallel to line A-A of the button-switch assembly of FIG. 8.

FIG. 9 illustrates a cut-away view parallel to line A-A of the button-switch assembly 100 of FIG. 8. As illustrated, switch 250 is disposed beneath the PET shim actuator 220 beneath the button 110. In sample configurations, the button-switch assembly 100 is stabilized by gluing the button 110 to the rubber deflection web 134 of the key mat assembly 130 in variable thicknesses 900 whereby the button flange 400 engages with the portion of the device housing 120 around the button 110 as shown in FIG. 4 to provide a stable tension force that prevents the button 110 from wobbling when depressed. In addition, as described above with respect to FIG. 2, the button 110 and the housing 120 may have a stair-stepped overlapping design at 210 whereby the button 110 and the housing 120 have variable thicknesses around the periphery of the button 110. Then, when the button 110 is depressed, the stair-stepped design 210 prevents wobble of the switch-button assembly 100.

Figure 10:
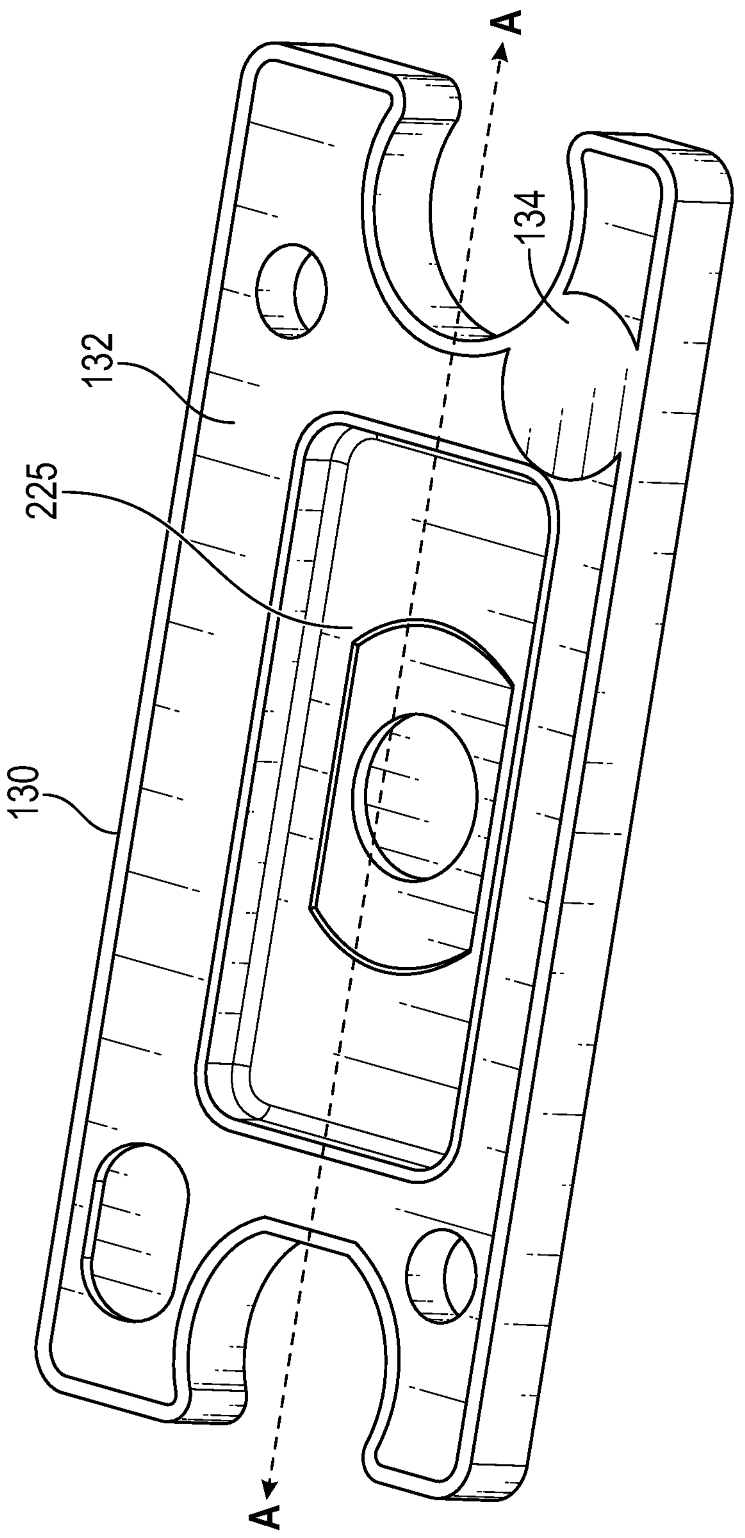
FIG. 10 is a bottom perspective view of the key mat frame underlying the button-switch assembly of FIG. 1B.

FIG. 10 illustrates a bottom side of the key mat frame 130 underlying the button-switch assembly 100 of FIG. 1B. In sample configurations, the key mat frame 130 may be formed by co-molding an injection part 132 (e.g., plastic) with a rubber layer 134. The injection part 132 provides the rigidity to the key mat frame 130, while the co-molded rubber layer 134 provides the expected key deflection and sealing functions. As also shown, the key mat frame 130 may also include a tooled pocket 225 that is adapted to accept the PET shim actuator 220.

Figure 11:
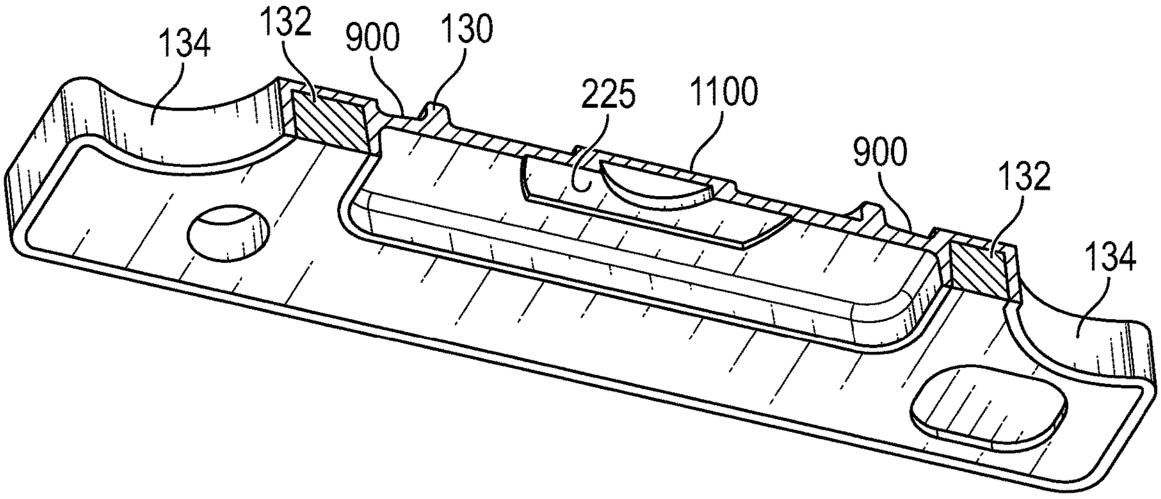
FIG. 11 is a bottom perspective view of a cut-away view parallel to line A-A of the key mat frame of FIG. 10.
Figure 12:
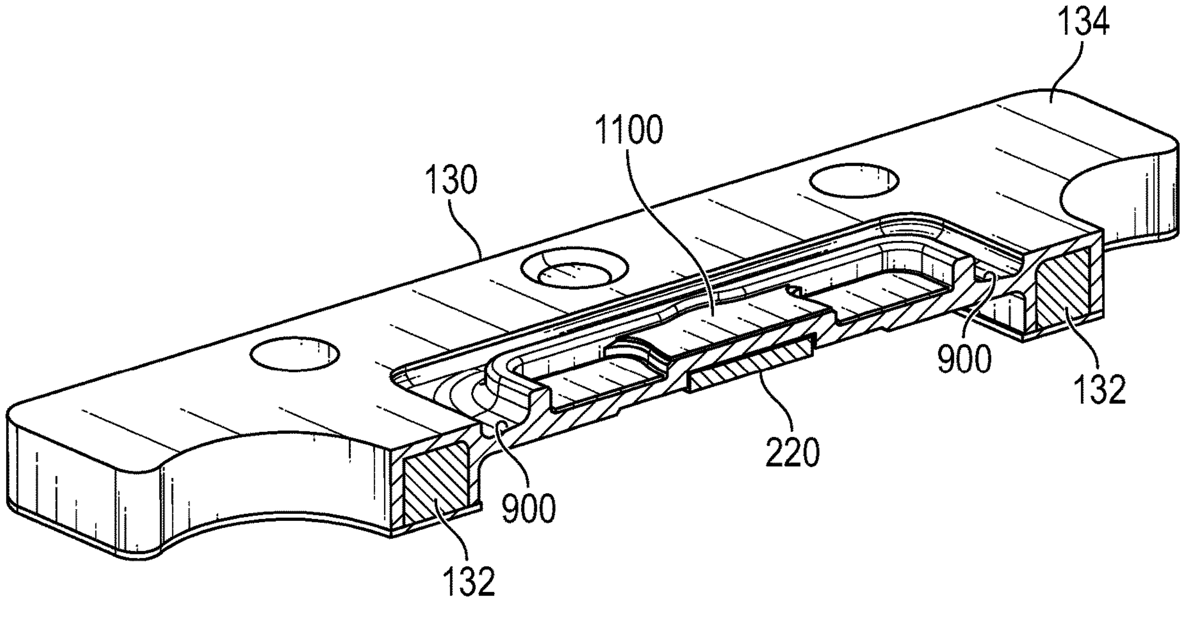
FIG. 12 is a top perspective view of a cut-away view parallel to line A-A of the key mat frame of FIG. 10.

FIG. 11 illustrates a bottom perspective view of a cut-away view parallel to line A-A of the key mat frame 130 of FIG. 10, while FIG. 12 illustrates a top perspective view of a cut-away view parallel to line A-A of the key mat frame 130 of FIG. 10. As is apparent from these views, the key mat frame 130 includes variable thicknesses 900 that provide a groove for accepting the button 110 and a portion 1100 that is glued to a bottom side of the button 110.

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

Those skilled in the art will appreciate that while the disclosure contained herein pertains to electronic eyewear devices having button-switch actuators for activating/inactivating functions of the electronic eyewear device, it should be understood that this is only one of many possible applications, and other configurations are possible. Accordingly, all such applications are included within the scope of the following claims.

What is claimed is:

1. A button-switch assembly, comprising:
- a button;
- a housing with a hole adapted to accept the button;
- a key mat frame disposed beneath the button, the key mat frame comprising an injection part and a rubber layer, the key mat frame having a pocket centered beneath the button;
- a shim actuator placed in the pocket;
- a switch beneath the shim actuator;
- a printed circuit board beneath the switch; and
- a double sided adhesive between the housing and the key mat frame and between the key mat frame and the printed circuit board to provide a seal that prevents water of dust from accessing the printed circuit board around an outer surface of the key mat frame,
- whereby depressing the button deflects the key mat frame and the shim actuator to depress the switch.

2. The button-switch assembly of claim 1, wherein the button and the housing have a stair-stepped overlapping design whereby the button and the housing have variable thicknesses around a periphery of the button to stabilize the button-switch assembly during use.

3. The button-switch assembly of claim 1, wherein the shim actuator is glued into the pocket of the key mat frame, and the key mat frame is glued to the button.

4. The button-switch assembly of claim 1, wherein the printed circuit board is flexible, further comprising a metal stiffener placed adjacent the flexible printed circuit board to stiffen the flexible printed circuit board sufficiently to assure that a force applied to the button will activate the switch via the shim actuator.

5. The button-switch assembly of claim 1, wherein the shim actuator is separated from the switch by a film that provides a protective layer separating the button from any electronics on the printed circuit board and preventing water or dust from reaching the electronics on the printed circuit board via a gap between the button and the housing.

6. The button-switch assembly of claim 1, wherein the key mat frame is adapted to deflect at an outward angle upon depression of the button to generate a consistent push force to the switch via the shim actuator.

7. The button-switch assembly of claim 1, wherein a difference between a peak force applied to the button to switch a state of the button is at least 20% above a volley force of the button.

8. The button-switch assembly of claim 1, wherein the button comprises side flanges around a periphery of the button that are adapted to engage the housing when the button is depressed off-center and rotates in a direction toward the housing.

9. The button-switch assembly of claim 8, wherein the button is glued to the rubber layer of the key mat frame in variable thicknesses whereby the side flanges of the button engage with a portion of the housing around the button to provide a stable tension force that prevents the button from wobbling when depressed.

10. An electronic eyewear device comprising the button-switch assembly of claim 1.

11. A method of forming a button-switch assembly, comprising:

placing a switch on a printed circuit board;

placing a button in a hole of a housing adapted to accept the button;

disposing a key mat frame beneath the button, the key mat frame comprising an injection part and a rubber layer;

centering a pocket of the key mat frame beneath the button;

placing a shim actuator in the pocket;

placing the shim actuator and the key mat frame over the switch whereby the shim actuator engages the switch; and applying a double sided adhesive between the housing and the key mat frame and between the key mat frame and the printed circuit board to provide a seal that prevents water or dust from accessing the printed circuit board around an outer surface of the key mat frame, whereby depressing the button deflects the key mat frame and the shim actuator to depress the switch.

12. The method of claim 11, wherein the button and the housing have a stair-stepped overlapping design, and wherein placing the button in the hole of the housing comprises placing a stair-stepped portion of the button beneath a corresponding stair-stepped portion of the housing whereby the button and the housing have variable thicknesses around a periphery of the button.

13. The method of claim 11, further comprising gluing the shim actuator into the pocket of the key mat frame and gluing the key mat frame to the button.

14. The method of claim 11, wherein the printed circuit board is flexible, further comprising placing a metal stiffener adjacent the flexible printed circuit board to stiffen the flexible printed circuit board sufficiently to assure that a force applied to the button will activate the switch via the shim actuator.

15. The method of claim 11, further comprising disposing a film between the shim actuator and the switch so as to separate the button from any electronics on the printed circuit board and to prevent water or dust from reaching the electronics on the printed circuit board via a gap between the button and the housing.

16. The method of claim 11, wherein disposing the key mat frame beneath the button comprises disposing the key mat frame so as to deflect at an outward angle upon depression of the button to generate a consistent push force to the switch via the shim actuator.

17. The method of claim 11, wherein the button comprises side flanges around a periphery of the button, further comprising placing the button in the hole of the housing whereby one or more side flanges engage the housing when the button is depressed off-center and rotates in a direction toward the housing.

18. The method of claim 17, further comprising gluing the button to the rubber layer of the key mat assembly frame in variable thicknesses whereby the side flanges of the button engage with a portion of the housing around the button to provide a stable tension force that prevents the button from wobbling when depressed.

* * * * *